(12) United States Patent
Silver et al.

(10) Patent No.: US 7,558,824 B2
(45) Date of Patent: Jul. 7, 2009

(54) ELECTRONIC MAIL (EMAIL) INTERNET APPLIANCE METHODS AND SYSTEMS

(75) Inventors: Edward Michael Silver, Atlanta, GA (US); E-Lee Chang, Mableton, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 637 days.

(21) Appl. No.: 09/882,597

(22) Filed: Jun. 15, 2001

(65) Prior Publication Data

US 2002/0023136 A1 Feb. 21, 2002

Related U.S. Application Data

(60) Provisional application No. 60/211,775, filed on Jun. 15, 2000.

(51) Int. Cl.
*G06F 15/16* (2006.01)
(52) U.S. Cl. .......................... 709/206; 709/219; 345/33
(58) Field of Classification Search ................ 709/206, 709/207, 219, 226; 345/33
See application file for complete search history.

(56) References Cited

U.S. PATENT DOCUMENTS

| | | | | |
|---|---|---|---|---|
| 5,574,777 | A | | 11/1996 | Lewis .......................... 379/142 |
| 5,583,924 | A | | 12/1996 | Lewis .......................... 379/142 |
| 5,699,417 | A | | 12/1997 | Khojasteh .................... 379/142 |
| 5,761,485 | A | * | 6/1998 | Munyan ....................... 345/839 |
| D397,112 | S | | 8/1998 | Locklin et al. ............. D14/151 |
| 5,826,062 | A | * | 10/1998 | Fake et al. ................... 715/207 |
| 5,836,009 | A | | 11/1998 | Diamond et al. ......... 379/93.23 |
| 5,862,212 | A | | 1/1999 | Mathews ..................... 379/386 |
| D405,447 | S | | 2/1999 | Landry et al. ............. D14/151 |
| D410,005 | S | | 5/1999 | Landry et al. ............. D14/151 |
| 5,933,478 | A | * | 8/1999 | Ozaki et al. .............. 379/93.24 |
| 6,052,442 | A | * | 4/2000 | Cooper et al. ............. 379/88.19 |
| 6,151,507 | A | * | 11/2000 | Laiho et al. ................. 455/466 |
| 6,161,130 | A | * | 12/2000 | Horvitz et al. .............. 709/206 |
| 6,304,898 | B1 | * | 10/2001 | Shiigi .......................... 709/206 |
| 6,363,412 | B1 | * | 3/2002 | Niwa et al. .................. 709/203 |
| 6,389,337 | B1 | * | 5/2002 | Kolls ............................ 701/29 |
| 6,393,463 | B1 | * | 5/2002 | Fuchigami ................... 709/206 |
| 6,424,997 | B1 | * | 7/2002 | Buskirk et al. .............. 709/206 |
| 6,516,341 | B2 | * | 2/2003 | Shaw et al. .................. 709/206 |
| 6,615,183 | B1 | * | 9/2003 | Kolls ............................ 705/26 |
| 6,741,855 | B1 | * | 5/2004 | Martin et al. ................ 455/419 |
| 6,785,732 | B1 | * | 8/2004 | Bates et al. .................. 709/232 |
| 6,839,741 | B1 | * | 1/2005 | Tsai ............................. 709/217 |

(Continued)

OTHER PUBLICATIONS

Landel Telecom; http://mailbug.com, "MailBug™: Real Email Without a Computer!"; Internet Download Apr. 26, 2001.

(Continued)

*Primary Examiner*—Ario Etienne
*Assistant Examiner*—El Hadji M Sall
(74) *Attorney, Agent, or Firm*—Thomas, Kayden, Horstemeyer & Risley, LLP (57) ABSTRACT

The present invention provides methods and systems for implementing an improved electronic mail (email) Internet appliance. Improved capabilities include streamlined mechanisms for viewing and managing email messages and for accessing network services. An email Internet appliance obviates the conventional requirements of purchasing a personal computer and tying up a phone line for long periods of time in order to exchange email messages and to read on-line news updates.

2 Claims, 2 Drawing Sheets

U.S. PATENT DOCUMENTS 6,847,989 B1 * 1/2005 Chastain et al. ............ 709/207

OTHER PUBLICATIONS

Landel Telecom; http://mailbug.com/pages/emaildisplay.html, "Email Display Mode"; Internet Download May 29, 2001.
Landel Telecom; http://mailbug.com/pages/mailbugspec.html, "MailBug Specifications"; Internet Download May 29, 2001.
Landel Telecom; http://mailbug.com/pages/mailbugimage.html, "Detailed Image"; Internet Download May 29, 2001.
Landel Telecom; http://mailbug.com/pages/addressbook.html, "Address Book"; Internet Download May 29, 2001.
Landel Telecom; http://mailbug.com/pages/phonebook.html, "Phone Book"; Internet Download May 29, 2001.
Landel Telecom; http://mailbug.com/pages/callerid.html, "Caller ID"; Internet Download May 29, 2001.
Landel Telecom; http://mailbug.com/pages/emailsummary.html, "Email Summary"; Internet Download May 29, 2001.
Landel Telecom; http://mailbug.com/, "MailBug."; Internet Download May 30, 2001.

* cited by examiner

ELECTRONIC MAIL (EMAIL) INTERNET APPLIANCE METHODS AND SYSTEMS

CROSS-REFERENCE TO RELATED APPLICATION

This application is a non-provisional application claiming the benefit of U.S. Provisional Patent Application No. 60/211,775 filed Jun. 15, 2000, entitled "Electronic Mail (E-Mail)/Internet Appliance," which is hereby incorporated by reference.

NOTICE OF COPYRIGHT PROTECTION

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

This invention relates generally to electronic mail methods and systems. More particularly, the present invention relates to electronic mail Internet appliance methods and systems.

BACKGROUND

Electronic mail (Email) is fast becoming as integral a part of life as the telephone. Like telephone access, email access is available to many in the home as well as in the workplace. Additionally, public places, such as libraries and coffee houses, now provide email access. One appeal of electronic mail is that it provides a capability to keep in touch with long distance friends and relatives without incurring long-distance charges. Another advantage is that electronic mail provides an interface mechanism for collecting information from Internet services.

However, conventional email systems require the user to own or access a computer with Internet access. Not everyone owns a computer or wants to leave their home merely to read or send electronic mail. Additionally, not every one has access to the Internet or wants to pay a monthly fee for such access.

Another requirement of many conventional email systems is that one access an email account via the telephone network, thus tying up a phone line. One can normally install a second phone line or acquire an alternative Internet access mechanism, such as Digital Subscriber Line (DSL) or cable. However, these solutions are often expensive.

Certain conventional systems (e.g., the Landel Telecom MailBug™ system) implement an email device that plugs into a household phone jack in serial with a telephone. A user of such a conventional system, therefore, does not need a personal computer to access email.

Although a user of conventional systems plugs the device into a household phone jack, email reading and manipulation is performed "offline." In other words, using such a conventional system does not tie up a phone line for longer than the time required to download or upload email from a mail server. Thus additional phone lines or alternate Internet access mechanisms are not necessary for the system user to access email.

Conventional systems, however, have some shortcomings. First of all, the display provided in such conventional systems is unnecessarily cluttered. Additionally, in order to perform certain functions using such conventional systems, a user is required to execute unnecessary steps.

The following patents discuss various aspects of telephony useful for background information and are incorporated herein by reference: Telephone Set, U.S. Pat. No. D410,005; Telephone Set, U.S. Pat. No. D405,447; Method And Structure For Detecting A Customer Premises Equipment Alerting Signal, U.S. Pat. No. 5,862,212; Caller Id Telephone With Signal Attenuation, U.S. Pat. No. 5,836,009; Telephone Set, U.S. Pat. No. D397,112; Text Transmission Using DTMF Signalling, U.S. Pat. No. 5,699,417; Caller Id And Call Waiting For Multiple CPEs On A Single Telephone Line, U.S. Pat. No. 5,583,924; and Caller Id And Call Waiting For Multiple CPEs On A Single Telephone Line, U.S. Pat. No. 5,574,777.

What is needed is a method and system for providing personal computer-free email access that avoids the disadvantages of conventional systems, while offering additional advantages.

SUMMARY

Embodiments of the present invention provide methods and systems for an email Internet appliance. Implementations of the present invention comprise a method, a process, a system, an apparatus, a computer readable medium, and a data stream.

Embodiments of the present invention provide mechanisms for manipulating email messages without the necessity for a personal computer. Manipulating email messages comprises inserting an email message into a classification container associated with a classification display section, segmenting a user interface into classification display sections, displaying a classification container in each classification display section, deleting an email message, sending an email message, and scrolling a page of email messages at a time.

Alternative embodiments of the present invention provide streamlined mechanisms for manipulating email messages by deleting. An example of one such mechanism comprises an invoking of a Delete-All option to quickly and efficiently delete all email messages without requiring a user to select an email message before all messages can be deleted. Another example comprises a mechanism allowing a user to invoke a Select-All option before invoking a Delete option to subsequently delete all messages. Such a mechanism permits a user to select all of the messages as a group, rather than individually, in order to efficiently delete all email messages.

Another embodiment provides a streamlined mechanism for manipulating email messages by sending saved messages. An example of such a mechanism comprises selecting a saved message, and then invoking a Send option. In yet another embodiment, a user is prompted as to whether the user wants to save an email message that has been sent. This prompting feature may be enabled/disabled at the option of a user via a setting in a configuration file that can be dynamically modified via a properties or options interface in alternative embodiments.

Additionally, embodiments of the present invention provide streamlined mechanisms for manipulating email messages by scrolling one page at a time. One example of such a mechanism comprises double clicking on a scroll bar and then selecting either an up arrow key or a down arrow key. Another example comprises a mechanism in which a user invokes a softkey (or a programmable function key).

An embodiment of the present invention provides a streamlined capability to select items in a network service. An example implementation of this capability comprises creating a short cut to an information item in a network service, and then invoking the short cut. In one embodiment, the network service comprises a news service. An exemplary news service is the LYCOS News Service.

An embodiment of the present invention provides a streamlined capability for updating (and creating) a phone book. Such a capability comprises the steps of receiving a data collection, which has phone data comprising a name and a number associated with the name, extracting the phone data from the data collection, determining whether the phone data is unique, and, if the phone data is unique, then adding the phone data to the phone book. Such an embodiment provides an advantage over conventional systems in that some conventional systems require a user to manually add phone data to each of a generic data collection, such as an address book, and a phone book.

An embodiment of the present invention provides a scrollable display for allowing a user to view at least six, but no more than fifteen, lines at a time. Such a screen is large enough for efficient viewing of messages, but small enough to keep the cost of the device to a minimum. And, in alternate embodiments, input is available via keyboard, and output is accomplished through an RJ-11 interface to a public switched network. Such input and output mechanisms provide a user with capabilities similar to personal computers, but without the added cost.

Embodiments of the present invention provide several advantages over conventional systems. First of all, a user of one embodiment of the present invention can access email accounts without having to use, or purchase, a personal computer. Secondly, a user of an embodiment need not tie up a phone line while reading email messages. Other embodiments provide streamlined methods for manipulating email messages, including but not limited to, the deleting of messages, the sending of messages and the page scrolling of messages. Additional improvements permit users to create or modify a phone book from a data collection, such as an address book. Another advantage for users of an embodiment is the capability to directly access desired information items within a network service.

Additional objects, advantages, and novel features of the invention will be set forth in part in the description which follows, and in part will become more apparent to those skilled in the art upon examination of the following, or may be learned by practice of the invention.

DETAILED DESCRIPTION

One embodiment of the present invention comprises an electronic mail (email) Internet appliance that provides email service and information service via a telephone line connection. Advantageously, a user does not have to use a computer or similar device to communicate via email or to access information services. The user may use the email device for email communication and for accessing information services.

In an embodiment, the email device is of a compact, low profile design that includes a keyboard and a display. The device advantageously is relatively small (in an exemplary embodiment—approximately 10.6" long×7" deep×2.75" high) and light (in an exemplary embodiment—approximately 1.75 lbs including the battery). As a result of its relative smallness and lightness, the email device is portable. The device connects to a standard, analog telephone line, supports dual tone multi-frequency (DTMF) or touch-tone dialing, and requires an AC power source. Thus, the device may be easily disconnected from a first location such as at the user's home, transported with the user, and set up at another location such as a hotel room of the user.

As noted, in addition to the display, the email device includes a keyboard for composing messages and implementing other functions. The keys of the keyboard are full-sized as those used in a keyboard of a word processor or such similar equipment. The email device may include buttons or other non-standard keyboard keys for use in composing email messages and executing other functions in connection with email or the information service. For example, the email device may include send, reply, forward, delete, etc. buttons. As another example, softkeys may be included to make selections from displayed lists easier. Advantageously, the buttons and softkeys or function keys are spaced on the email device such that they are easy to use.

The device also includes a display for presenting email messages and information that are received, email messages that are composed by a user of the device, and instructions, advice and other text information. An exemplary email device includes an eight-line screen display that is large enough to allow the user to see complete lines (seventy-nine characters in an exemplary embodiment) of text. The display may be configured in a number of different ways. For example, the top line of the display may include information that provides current status of the device. This current status information may include a time and date indication and the device may make automatic adjustments for the implementation of daylight savings time. The center six lines of the display may be used for a list of email messages, for display of information, for instructions to a user, etc. The bottom line of the display may include information such as display labels for the function keys of the device. Further, the display may include fluorescent backlighting to provide excellent readability. In addition, the display may include scrolls (up/down, side-to-side, right/left) to enable the user to change the text being displayed. The user can further modify the contrast and brightness of the display.

Generally, an exemplary embodiment of the email device, according to the present invention, includes the following components: the device; a 12 volt ac-dc adapter; a 9 volt battery; a 6-foot telephone line cord, guide or manual, and a summary of operation.

The device may share a telephone line with a telephone or other equipment such as an answering machine, but the device does not interrupt or otherwise affect conventional telephone service on the telephone line. A second line for the email device is unnecessary. When sharing the line, the email device senses when the line is in use and places a call to send or retrieve email only when the line is not being otherwise used. All reading and composing of messages is done while the email device is off-line, and therefore, the activities of reading and composing email do not tie up the telephone line.

In an embodiment, the email device provides a single mailbox (single email address) for email messages, but any number of people may share the mailbox. The largest email message that may be received on the email device is a message of 16,000 characters, which is about four pages of typed text. Any characters in excess of this number are deleted. The original email message in undeleted form may be made available on a web-mailbox to which the user may have access.

When an email message or other information is received, a slow blinking light on the device may be set to indicate that a message or other information has been received. The slow blinking light, a different light, or a different indicator may be used in the email device to provide an indication to the user of the following: an unread email message; a new voicemail (such as on an answering machine on the line), a new call to the line; a line-in-use status. The light may be "on" continuously when the telephone or other connected equipment is in use on the telephone line. When a call is being received, then the blinking light may blink more quickly.

A problem with the blinking light or other indicator being used with the receipt of new voicemail messages is that it is difficult for a user to determine whether new calls, new email messages, or voice mails have been received. The difficulty stems from the fact that a call may be received to the caller's line, but then the caller hangs up leaving no message. Even though no message has been left, the light blinks to indicate that a call had been received. The blinking light frustrates a user who checks the email device to find that in fact, no new message (email or voice mail) has been received. Thus, an exemplary embodiment provides that no light or other indicator blink or otherwise operate to indicate the receipt of a new call. In this way, the light blinks at least to indicate the receipt of a new email, so that when the user checks for messages, at least a new email message is present.

In alternate embodiments, the email device may be set for either manual or automatic email checking. In automatic checking, the email device checks for new email for the user on a variable basis. If the email device is frequently used, then the email device may check for new emails more often than if the device is less frequently used. The device in automatic checking mode generally checks at least once per day, and may check every few hours. A manual check for new messages may be initiated at any time by the user, even if the email device is in the automatic mode. In an exemplary embodiment, this manual check may be carried out while in the automatic mode by pressing the CONNECT key or the CTRL key of the device.

To view an email message on the display of the email device, the user may be required to provide a password. In other words, password protection may be incorporated as a feature of the email device.

The email messages that are received by an email device may be stored, may be accessed, and may be managed. For example, the email device allows for storage of up to 100 messages with a total capacity of up to 120K characters.

In an exemplary embodiment, the email device displays all messages (whether received, sent, or outgoing) in the same display. In other words, when a user selects email on the email device, the user is presented with a list of all emails regardless of whether the emails were received, sent, or "to-be" sent. Because the display only allows for six email messages to be shown at any one time, it quickly becomes cumbersome to navigate through a large list of email messages. The email device has a limited memory capacity, and thus, the "all email" display feature may have been implemented as a way to save memory.

Another exemplary embodiment of the email device includes a feature whereby "sent messages" are separated from the other email messages, and the sent messages may be displayed in their own section in the display of the email device. Yet another exemplary embodiment of the email device further reduces the possibility of clutter on the display of email messages by giving the user the choice of saving and/or of deleting an email message that has been sent. This choice may be presented to the user after the user strikes the key that sends the email message. If the user chooses the "not save" or to "delete" the sent email message, then the sent email message does not appear on the display.

In some embodiments of the email device, a user who has saved an email message, and who now desires to send the saved email message must first open the email message and then press a function button labeled "change" before the user is given the option to "send" the saved email message. An alternative embodiment of the email device allows a user to "send" the saved email message without first having to press the "change" button.

Also, in some embodiments of the email device, when a user connects the email device to the server and the server is transmitting email messages to the email device, the display of the device bears the message: "Forwarding your mail". Because the term "forwarding" may be ambiguous and confused with functions of email forwarding to others, an alternate embodiment substitutes the message: "Sending your mail."

To scroll through the email messages, the user may use up or down arrows. But to scroll up or down a page at a time, it is necessary in some embodiments for the user to hold down the CNTRL key while pressing the up or down arrows to accomplish the scrolling. This is a disadvantage because a user may not intuitively or otherwise know to hold down the CNTRL key to obtain page scrolling. Thus, alternative embodiments of the email device provide that a user not have to hold down the CNTRL key while using the up or down arrows to accomplish the page scrolling. Instead of the CNTRL key, some other key, such as a shift key or a softkey, may be pressed (but not necessarily held down), or a double click on the scroll bar prior to using the up or down arrows may accomplish the page scrolling.

In an exemplary embodiment, a diamond shape or symbol is used in various ways in the email device. For example, the email device distinguishes between read and unread mail on the display through the use of a diamond shape or symbol. The same diamond symbol is used to identify mail that is to be sent, but has not yet been delivered. The diamond symbol also is used to identify the most frequently used function keys. Given that repetitive use of the diamond symbol may cause possible confusion, an alternative embodiment does not repeat the use of a diamond symbol or shape. In other words, the diamond symbol or shape is used at most for one feature or function. Other symbols or shapes are used in place of the other diamond shapes previously used.

In another embodiment, an email device includes storage (non-volatile electronic memory) for one or more address books that may be used by the caller in connection with email messaging. For example, an email address book of the device may store up to 100 addresses. The device also may include a telephone book for the storage of frequently used telephone numbers, and the telephone book may store up to 100 telephone numbers. In some embodiments, the address book for email addresses and the telephone book for telephone numbers do not compliment one another. In other words, a user has to separately enter information about an addressee in the email address book, and then enter information about the addressee in the telephone book. In an alternative embodiment, where the information for the addressee is the same between the email address book and the telephone book, the information is entered into one of the two books then copied into the second book.

The email device further includes a feature that allows a user to use the device to check an email message box associated with another email account, so long as the service provider supports the appropriate standards for such a feature. For example, an exemplary embodiment of the email device uses the POP3 protocol.

An embodiment of an email device, according to the present invention, may be used to send an email to anyone with an Internet email address. A person does not have to have an email device to receive emails from a user of the email device. The user of the email device may send an email message to more than one person (or email address).

In an exemplary embodiment, the email device may be used in a manual mode to compose and send email messages. When a user is done composing an email, the user indicates the message is ready to be sent by pressing a function button labeled "send". Pressing the "send" button does not actually send the email, it only saves the composed email message in ready-to-send form. If a user wants to send the message (while in manual mode), the user must press the function key labeled "done" to get out of the email menu. When the user has reached the top level of the of the email menu, then the user must press the "connect button". A disadvantage of this exemplary embodiment in the manual mode is that some users may mistakenly believe that they have sent an email message after they have pressed the "send" button. Thus, because of this possibility of confusion, another exemplary embodiment of the email device provides that the manual mode not be used—at least for composing and sending email messages.

Advantageously, the email device places a local call or an 800 number call to send and retrieve email message. Thus, there are no long distance or other toll charges in connection with the use of the device for email.

The email device also includes a calling number identification (CallerID) feature so that a user does not have to have a separate CallerID box to identify incoming calls. The CallerID feature may provide the name, number, time, and date of a call that has been received on the telephone line. The CallerID feature may include a CallerID log to save up to ninety-seven call records. A telephone number that is included in an entry in the CallerID log may be auto-dialed through the use of a telephone book Caller ID log. When the telephone number of an incoming call matches a number in the email devices' telephone book, then a name is displayed indicating the name of the person or entity calling.

As previously noted, the email device may be used to obtain information through a Web service. In an exemplary embodiment, a user may press the "e-Info" key of the email device or a soft key to display Web service information. For example, the following types of information may be obtained: top news, sports news, world news, entertainment news, health news, stock quotes, sports scores, daily horoscopes, and local weather forecasts. The email device does not include a browser, so the email device is unable to be used to browse the Web.

In an exemplary embodiment, once a user chooses "e-Info" and a connection is made to the server, the user is presented with two choices: LYCOS News Service; or More to Come. The More to Come option is not really an option in this embodiment because nothing has been implemented. Therefore, an alternative embodiment does not present the user with those two choices. Rather, when only the LYCOS news Service (or any other service) is only available, then the email device goes directly to the only available option.

Another exemplary embodiment allows a user of the e-Info feature to create shortcuts to speed the selection of information items. For example, the user may identify a city to be used in connection with the provision of weather information, or may identify particular stocks for use in providing the user with stock information. Yet another exemplary embodiment includes a shortcut for the user in the use of the "return" key to enter information into the e-Info section or feature. For example, in this yet another exemplary embodiment, the user may select "weather" as information desired and may be prompted to enter the initials of the State for the weather information. Rather than having to press or implement some other function like an OK function after the state initials have been entered, this yet another exemplary embodiment allows the user to simply press the "return" key after the initials of the State have been entered. In some instances in the yet another exemplary embodiment, the "return" key may be pressed in place of the "OK" or other key in other embodiments to signal the continuation of a function. Advantageously, the "return" key is typically easier to press and steps of the process may be eliminated by the use of the "return" key instead of the "OK" key.

The email device is provided with the email service through a service provider that bills the user for the service provided. The service provider typically operates a service platform in a data network such as the Internet to provide email services to each of the email devices that are served by the service provider.

The email device may provide for email with attachments that are text or HTML, or other file types that can be converted into text. Other types of attachments (graphics, spreadsheets, pictures, etc.) cannot be viewed on the email device, and are deleted from any email message including such an attachment at the server. Advantageously, a service provider may provide a computer user with a web-mailbox account so that the user may access email messages that have been sent with attachments. Another advantage is that the web-mailbox account may include a duplication of the emails that the user received on the email device (but with attachments where they are included with emails).

In an embodiment, the email device does not include a printer. To print an email, the user may forward the email to a location that does include a printer and print the email from that forwarded location. In addition, a user may use a computer (connected to the Internet) with a printer to access the web-mailbox account so that the email message is accessed and printed.

Additional information from a human factors analysis is discussed in the ensuing paragraphs.

Exemplary embodiments of the email device include a manual. An alternative exemplary embodiment provides a 1-2 page help guide as a summary of the manual. Such a help guide may be used by beginners, who would be intimidated by a manual, and by experienced people, who desire to jump right in to operation of the device rather than read a manual.

An exemplary embodiment of the email device provides the device in "automatic" mode as the default mode. In automatic mode, the email device periodically sends or receives email messages without user intervention. This is a useful feature because in some embodiments of the email device, it has not been clear when a message has been "sent". For example, in some embodiments of the email device, when a user has finished composing a message, the user indicates that the message is ready to be sent by processing a function button labeled "send". In manual mode, this button does not actually insure that the mail will be sent. If a manual mode user wishes to transmit an email, that user must first press "send", then press "done" to get out of email mode. Finally that user must push the "connect" button to actually transmit the mail. It is likely that some users (while in manual mode) will wrongfully assume that mail has been sent the "send" function button has been pressed. Such users would be frustrated. Thus, an exemplary embodiment provides for an automatic mode to be used as the default operating mode rather than a manual mode.

Additional objects, advantages, and novel features of the invention will be set forth in part in the description which follows, and in part will become more apparent to those skilled in the art upon examination of the following, or may be learned by practice of the invention.

EXAMPLE

Figure 1:
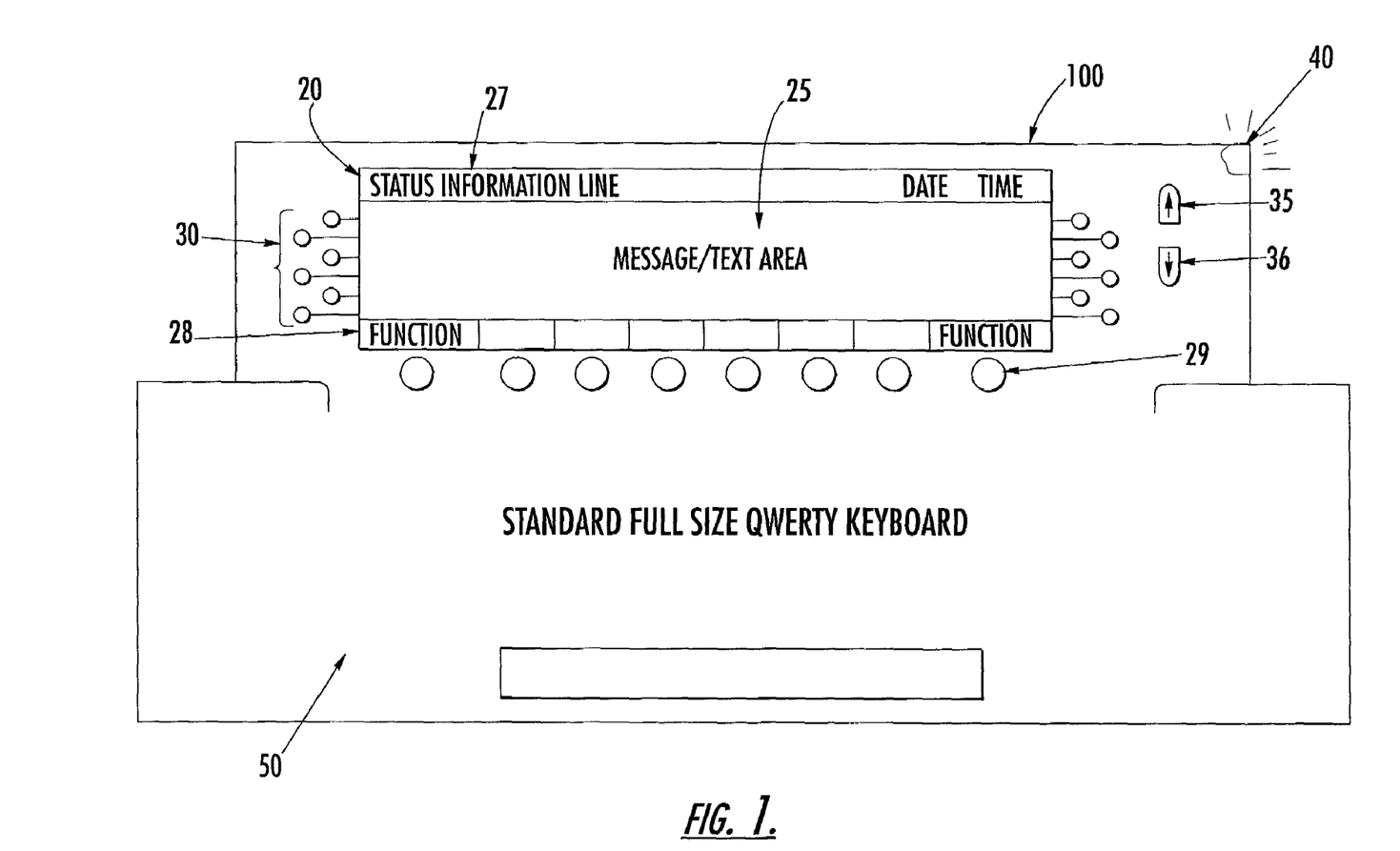
FIG. 1 comprises an exemplary hardware embodiment of the present invention.
Figure 2:
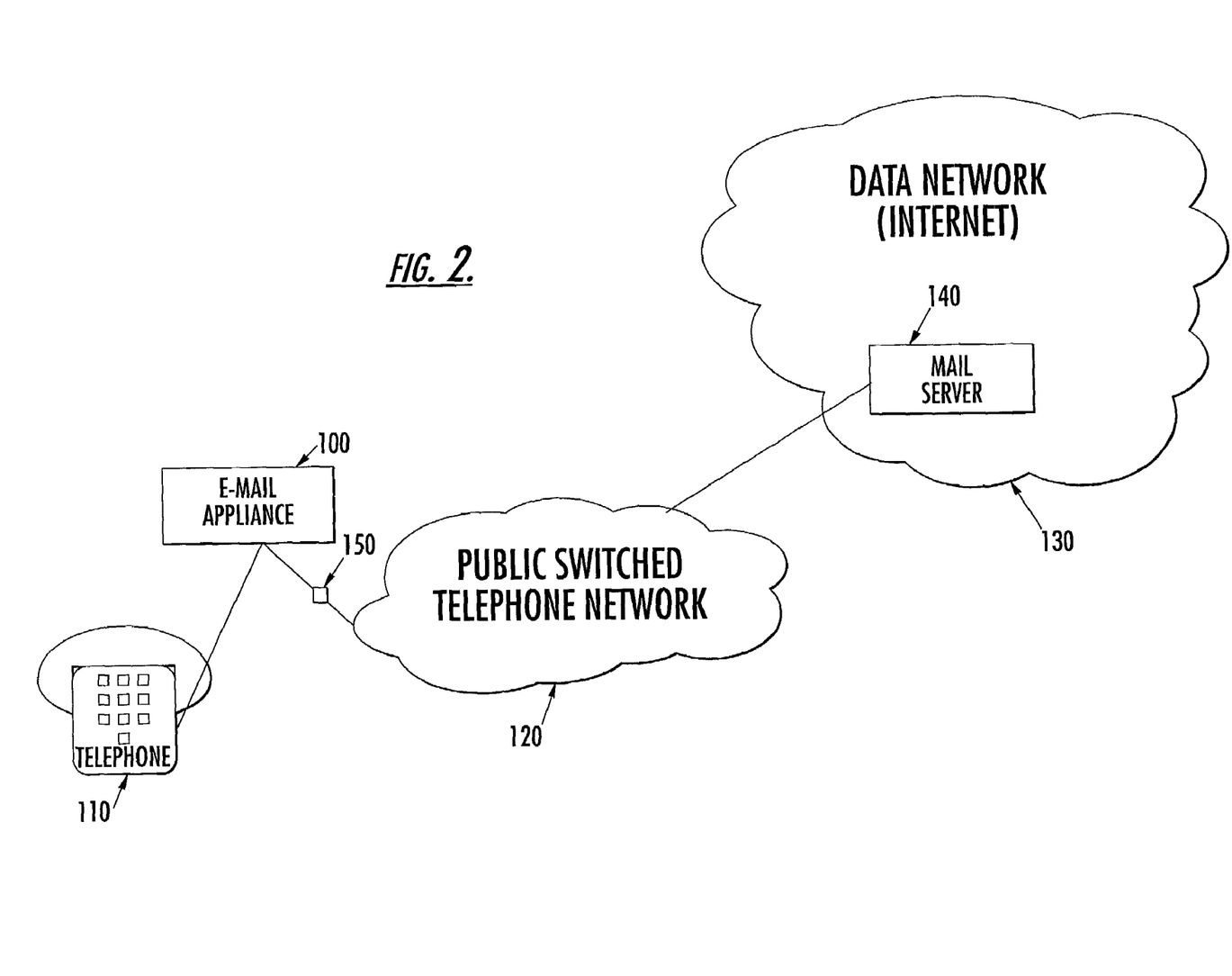
FIG. 2 comprises an embodiment of the present invention illustrating interconnection with a Public Switched Telephone Network.

FIG. 1 and FIG. 2 show an example of an embodiment of the present invention. FIG. 1 illustrates an embodiment of an Email Internet Appliance 100. An Email Internet Appliance 100 comprises a standard full size QWERTY keyboard 50 for input and a display 20 for presenting output to a user. Other types of keyboards may be utilized in alternative embodiments.

Display 20 comprises a message/text display area 25, which displays six lines of text, in one embodiment, a line below the message/text display area 28 for display labels 28 which label function keys 29, and a status information line 27, which presents the current status of the Email Internet Appliance 100 and is located above the message/text display area 25. Examples of current status information that may be provided to a user include mode of operation (automatic or manual) and date/time. Other display types may be used in alternative embodiments, providing a display of up to fifteen lines of message/text.

Located below label function keys 28 are function keys 29. Function keys 29 are keys programmed to implement certain functions, such as "Change", "Delete-All" and "Forward". Buttons 30 are located to the side of the message/text display area 25 and invoked by a user to surface screen menus. Scrolling keys 35 (for scrolling up) and 36 (for scrolling down) are provided for navigating through large numbers of email messages.

A status indicator light 40, in one embodiment, employs a blinking frequency to indicate Email Internet Appliance 100 status. For example, a fast blink may indicate that an email has been received, a slow blink may indicate a voicemail message has been received, and a status indicator light 40 that is constantly on may indicate that the phone is in use.

The Email Internet Appliance 100 provides a user with electronic mail (or email) access without the need for a computer. In one embodiment, a user plugs a household telephone into the Email Internet Appliance 100, which then attaches to the phone system.

FIG. 2 comprises an illustration of an embodiment in which the present invention is interfaced to a conventional telephone system. A telephone 110 is connected to an email Internet appliance 100 using an RJ-11 interface. Email Internet Appliance 100 is then plugged into a telephone system interface, such as a RJ-11 phone jack 150.

An RJ-11 phone jack 150 provides network access from an email user's house to the Public Switched Telephone Network 120. The Public Switched Telephone Network 120 provides a communications path to a Data Network 130, implemented by an Internet Service Provider, in one embodiment. Data Network 130 comprises, among other network elements, a mail server 140. Examples of a Data Network 130 include, but are not limited to, an internet and an intranet.

An email user of an Email Internet Appliance 100 accesses the user's email by establishing a connection to a mail server 140. Once the connection is established, Email Internet Appliance 100 and mail server 140 exchange information using the Internet Post Office Protocol, POP3, in one embodiment. The exchange of information may include, for example, the downloading of received email messages from the mail server 140 to the Email Internet Appliance 100 or the uploading of sent email messages from the Email Internet Appliance 100 to the mail server 140.

A user conducts an email session with at least one mail server. The user displays email messages in the email message text area 20 of an email appliance 10. In one embodiment, email messages are stored in classification containers. Examples of classification containers include vectors, lists, text fields and windows. Each container represents a different message category, based upon a type or classification of the email message. Email message categories comprise new, sent, read, marked for deletion, and saved message types. Classification containers will store at least one email message type. The scrollable email message text area 20 displays a concatenation of these categories of email messages. Each message category may be displayed in a clearly marked segment (for example, a listing of all email messages of a particular type preceded by a descriptive header) or all categories may be merely listed one after the other, but with email messages grouped according to message type. A classification container will be displayed in each display section or segment.

Alternatively, a user may be given a choice of which email message types the user would like to see displayed in the scrollable email message text area 20. Based upon the user's selection (or classification display section request), a concatenation of the sections representing the selected email types appears in scrollable email message text area 20. A classification container will be displayed in each section or segment.

In alternate embodiments, a user conducts an email session by first accessing at least one mail server. The user then downloads and/or uploads mail messages from/to the server. Mail messages, including those received and those sent but saved, are stored in a database in one embodiment. Additionally, an email session may be conducted according to the Internet Post Office Protocol POP3.

A user of the present invention can manipulate email messages in the manners previously discussed. In one embodiment, deleting an email message, including the simultaneous deleting of multiple messages, is streamlined. All email messages may be quickly deleted by invoking a "Delete-All" option. In alternate embodiments, a Delete-All option may be implemented as a softkey or as a menu option, which is made visible by hitting a "control" key. When selected, the Delete-All option removes all email messages from all classification containers.

In another embodiment of the present invention, a user first chooses a "Select-All" option, and then invokes a "Delete" option to quickly and efficiently delete all email messages, by removing all messages from all classification containers. In alternate embodiments, a Select-All and a Delete option may be implemented as softkeys or as menu options, which are made visible by hitting a "Control" key.

Additionally, in order to quickly and efficiently delete multiple email messages, but not necessarily all messages, a user of an embodiment of the present invention first selects (e.g., highlights) at least two messages and then invokes a "Delete" option, resulting in the removal of all messages from all classification containers. As discussed above, a Delete option may be implemented as a softkey or as a menu option, which is made visible by hitting a "Control" key.

Another typical way a user manipulates email messages in the present invention is to send a message. One embodiment streamlines the sending process by allowing the user to first select at least one saved message, and then invoke a "Send"

option. This results in the selected messages being "sent" or transferred from the appropriate classification container(s) on the present invention to a mail server implementing the POP3 protocol, in one embodiment.

In an alternate embodiment, a user is prompted each time the user sends an email message. The user is queried by a prompter in communication with the Display 20 as to whether the user desires to save a copy of the sent mail message. This prompting feature may be enabled/disabled at the option of a user via a setting in a configuration file that can be dynamically modified via a properties or options interface in alternative embodiments.

An additional manner of manipulating email messages in the present invention is to scroll messages up or down one page at a time. One embodiment streamlines the page scrolling process by allowing the user to first double click on a scroll bar, and then to press an up arrow or a down arrow to cause the display of email messages to scroll up or down, respectively, one page at a time. In an alternative embodiment, a user selects a softkey (or a programmable function key) to scroll up or down one page at a time, depending upon the function that is represented by the softkey.

With the present invention, a user is in communication with a computer network, such as an internet, and is able to connect in a more streamlined manner in order to communicate with network services. In an embodiment, the user can establish (i.e., create new or modify existing) configuration files and save configuration files that are associated with network services. As a first step in connecting to a network service, the user selects a desired network service, such as the LYCOS News Service, from a menu that is made visible by depressing a softkey or function key, in one embodiment. The present invention then connects to the network service through the Public Switched Telephone Network (PSTN) to a server or an Internet Service Provider (ISP), in alternative embodiments. The present invention forwards the network service address, which corresponds to the user's selection, and the previously established configuration file. The network service address directs the server, in one embodiment, to the network service with which to connect. The configuration file directs the network service to present the user's desired interface (or configuration).

In another embodiment, a user of the present invention creates a short cut to an invention item in a network service. A user then invokes the short cut to go directly to the area of the network service to which the short cut refers.

Once the user connects and the network service automatically configures, the user may then conduct an interface session with the selected network service. An interface session with a network service, including a news service such as the LYCOS News Service, comprises user activities such as browsing through email messages of current events and engaging in chat sessions.

An embodiment of the present invention also provides a mechanism to create or modify (i.e., update) a phone book from other data collections, such as an address book. A user selects an option to create or modify a phone book from a data collection, such as an address book. The user provides the name of a data collection, and the present invention receives that data collection and extracts phone data, comprising a name and an associated phone number, from the data collection. If a phone book does not exist, the present invention creates a new phone book from this extracted data. Or, the present invention compares the name and number pairs of the extracted phone data to the name and number pairs in the existing phone book, and adds those pairs that are unique (i.e., do not appear in the existing phone book) to the existing phone book.

It should be noted that the present invention may also be embodied as computer readable code on computer readable medium. The computer readable medium is any data storage device that can store data, which can thereafter be read by a computer system. Examples of computer readable medium include read-only memory, random access memory, CD-ROMs, magnetic tape, optical storage devices, and DVD discs. The computer readable medium can also be distributed over a network via interconnected computer systems, so that the computer readable code is stored and executed in a distributed fashion.

Various embodiments of the invention have been described in fulfillment of the various objects of the invention. It should be recognized that these embodiments are merely illustrative of the principles of various embodiments of the present invention. Numerous modifications and adaptations thereof will be apparent to those skilled in the art without departing from the spirit and scope of the present invention.

What is claimed is:

1. A method of manipulating email messages with an email network appliance comprising:

receiving an email message from an email server, wherein the email server is particularly configured to provide an email service to a plurality of email network appliances that can only receive text of an email message, with an email network appliance, the email message having had attachments that cannot be viewed on the email network appliance automatically deleted by the email network appliance email service provided by the particularly configured email server, such that the email message is text only;

classifying the text only email message;

inserting the text only email message into a classification container;

presenting the classification container in a classification display section comprising at least two sections, each section containing one classification container;

presenting a text only email message in a classification container, wherein all presenting of the text only email message is performed off-line and prompting a user to save a sent email message;

wherein the email network appliance comprises a handheld email Internet appliance connected to a public switched network via an RJ-11 interface, the appliance further comprising a keyboard and a scrollable line display capable of presenting at least six lines but no more than fifteen lines.

2. An email network appliance for manipulating email messages comprising:

a processor configured to:

receive an email message from an email server, wherein the email server is particularly configured to provide an email service to a plurality of email network appliances that can only receive text of an email message, with an email network appliance, the email message having had attachments that cannot be viewed on the email network appliance automatically deleted by the email network appliance email service provided by the particularly configured email server, such that the email message is text only;

classify the text only email message;

insert the text only email message into a classification container;

present the classification container in a classification display section comprising at least two sections, each section containing one classification container;
present the text only email message in a classification container, wherein all presenting of the text only email message is performed off-line and
prompt a user to save a sent email message;

a handheld email Internet appliance connected to a public switched network via an RJ-11 interface;
a keyboard; and
a scrollable line display capable of presenting at least six lines but no more than fifteen lines.

* * * * *